United States Patent
Lim

(10) Patent No.: US 11,492,109 B2
(45) Date of Patent: Nov. 8, 2022

(54) METHOD AND APPARATUS FOR DETERMINING LOCATION INFORMATION OF SIGNAL SOURCE USING UNMANNED AERIAL VEHICLE

(71) Applicant: Electronics and Telecommunications Research Institute, Daejeon (KR)

(72) Inventor: Kwang Jae Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 653 days.

(21) Appl. No.: 16/403,298

(22) Filed: May 3, 2019

(65) Prior Publication Data

US 2019/0389578 A1 Dec. 26, 2019

(30) Foreign Application Priority Data

Jun. 25, 2018 (KR) .......................... 10-2018-0072776

(51) Int. Cl.
*G05D 1/10* (2006.01)
*B64C 39/02* (2006.01)
(Continued)

(52) U.S. Cl.
CPC .......... *B64C 39/024* (2013.01); *G05D 1/101* (2013.01); *H04B 1/082* (2013.01); *H04B 1/10* (2013.01);
(Continued)

(58) Field of Classification Search
CPC .......... B64C 39/024; B64C 2201/122; H04W 4/029; G05D 1/101; H04B 1/082; H04B 1/10
See application file for complete search history.

(56) References Cited

U.S. PATENT DOCUMENTS 5,818,389 A * 10/1998 Lazar ...................... G01S 3/16
342/383
2010/0321234 A1* 12/2010 Goldman ............ G01S 13/9054
342/25 A
(Continued)

FOREIGN PATENT DOCUMENTS

KR 1020170082016 A 7/2017

OTHER PUBLICATIONS

H. C. So, Source Localization: Algorithms and Analysis, Handbook of Position Location: Theory, Practice, and Advances, First Edition, Chapter 2, pp. 25-66, John Wiley & Sons, Inc., Department of Electronic Engineering, City University of Hong Kong, Kowloon, Hong Kong.

*Primary Examiner* — Peter D Nolan
*Assistant Examiner* — Roy Rhee
(74) *Attorney, Agent, or Firm* — William Park & Associates Ltd.

(57) ABSTRACT

Disclosed is a method of determining location information of a signal source. A method of determining location information of a signal source by using an unmanned aerial vehicle according to an embodiment of the present disclosure includes determining, at a first location, first location information and first posture information of the unmanned aerial vehicle provided with a linear array antenna; determining, at the first location, a first measurement azimuth between the signal source and the linear array antenna; determining, at least one second location, at least one second location information and at least one second posture information of the unmanned aerial vehicle having the linear array antenna; determining, at the at least one second location, at least one second measurement azimuth between the signal source and the linear array antenna; and predicting (Continued)

the location information of the signal source using the information described above.

18 Claims, 10 Drawing Sheets

(51) Int. Cl.
    *H04B 1/08*           (2006.01)
    *H04W 4/029*       (2018.01)
    *H04B 1/10*           (2006.01)

(52) U.S. Cl.
    CPC ....... *H04W 4/029* (2018.02); *B64C 2201/122* (2013.01)

(56) References Cited

U.S. PATENT DOCUMENTS

| | | |
|---|---|---|
| 2016/0217692 A1 | 7/2016 | Lee |
| 2017/0215220 A1 | 7/2017 | Kim et al. |
| 2018/0011180 A1* | 1/2018 | Warnick .................. G01S 13/06 |
| 2018/0348032 A1* | 12/2018 | Chen ..................... G01F 1/7086 |

* cited by examiner

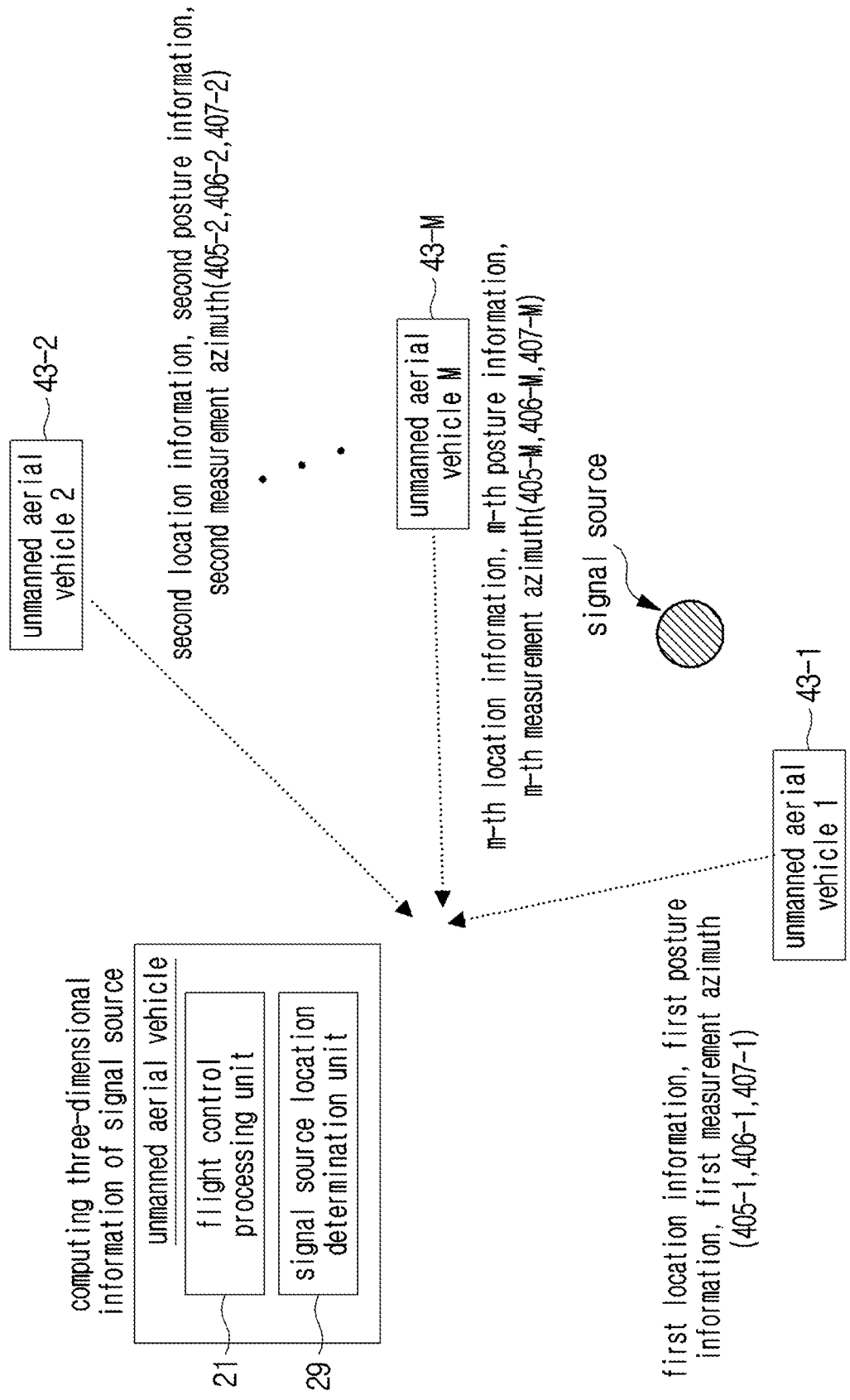

METHOD AND APPARATUS FOR DETERMINING LOCATION INFORMATION OF SIGNAL SOURCE USING UNMANNED AERIAL VEHICLE

CROSS REFERENCE TO RELATED APPLICATION

The present application claims priority to Korean Patent Application No. 10-2018-0072776, filed Jun. 25, 2018, the entire contents of which is incorporated herein for all purposes by this reference.

BACKGROUND OF THE INVENTION

Field of the Invention

The present disclosure relates to a technology for determining location information and, more particularly, to a method and an apparatus for determining location information using an azimuth determined through a linear array antenna.

Description of the Related Art

Recently, as the development of industrial technology and the development of information and communication technologies have accelerated and expanded the technological development of unmanned aerial vehicles such as drones, their application fields are becoming widespread.

For example, attempts are being made to provide medical goods or emergency relief goods to disaster areas by equipping the unmanned aerial vehicle with equipment capable of mounting goods thereto, or to quickly deliver goods ordered by the user as a transportation service such as a courier service. In addition, the unmanned aerial vehicles are installed with a camera so that they are utilized in various fields, such as relay broadcasting of sports events, monitoring for safety accidents at beaches or construction sites, spraying pesticides on agricultural lands, or performing dangerous tasks on behalf of people in places where it is difficult for people to approach.

SUMMARY OF THE INVENTION

The location of a signal source on the ground may be searched using the unmanned aerial vehicle. For example, the signal source may be a jammer that generates an unwanted radio signal, or a signal source that generates a signal for a rescue and search.

In order to determine the location information of the signal source on the ground using the unmanned aerial vehicle, equipment that may measure a direction of arrival (DoA) of the signal source, a difference of reception time, a frequency difference, and the like is required.

Specifically, a direction of arrival of the signal source may be measured through an array antenna provided in an unmanned aerial vehicle. In order to measure three-dimensional location information of the signal source, azimuth and elevation have to be measured as the direction of arrival of the signal source. For this purpose, a two-dimensional array antenna or a circular array antenna has to be mounted on the unmanned aerial vehicle.

However, when a two-dimensional array antenna or a circular array antenna is mounted on an unmanned aerial vehicle, the weight and size of the array antenna on the unmanned aerial vehicle increases and the power for driving the unmanned aerial vehicle also increases. In addition, since two-dimensional azimuth and elevation have to be measured, the amount of computation for signal processing to measure the direction of arrival rapidly increases in comparison with a case of measuring only an azimuth by a one-dimensional array antenna, whereby an increase in size, power, and weight of the battery are caused. In order to mount a two-dimensional linear array antenna or circular array antenna on an unmanned aerial vehicle, a large unmanned aerial vehicle is required.

It is an object of the present invention to provide a method and an apparatus for determining three-dimensional location information of a signal source using an azimuth measured at multiple locations from an unmanned aerial vehicle having a linear array antenna.

The technical objects to be achieved by the present disclosure are not limited to the above-mentioned technical subjects, and other technical subjects which are not mentioned are to be clearly understood from the following description to those skilled in the art.

In order to achieve the above objects, a method of determining location information of a signal source by using an unmanned aerial vehicle according to an embodiment of the present disclosure includes determining, at a first location, first location information and first posture information of the unmanned aerial vehicle provided with a linear array antenna; determining, at the first location, a first measurement azimuth between the signal source and the linear array antenna; determining, at least one second location, at least one second location information and at least one second posture information of the unmanned aerial vehicle having the linear array antenna; determining, at the at least one second location, at least one second measurement azimuth between the signal source and the linear array antenna; and determining the location information of the signal source using the first location information, the first posture information, the first measurement azimuth, the at least one second location information, the at least one second posture information, and the at least one second measurement azimuth.

An apparatus for determining location information of a signal source according to another aspect of the present disclosure includes a flight control processing unit determining location information and posture information of a unmanned aerial vehicle and controlling movements of the unmanned aerial vehicle; a linear array antenna; and a signal source location determination unit measuring a measurement azimuth corresponding to a signal received from the signal source using the linear array antenna, determining information on multiple locations and postures, and multiple measured azimuths corresponding to multiple locations different from each other respectively, and determining three-dimensional location information of the signal source on the basis of the information on multiple locations and postures, and the multiple measured azimuths.

A system for determining location information of a signal source according to still another embodiment of the present disclosure includes at least one unmanned aerial vehicle having a linear array antenna to measure an azimuth to the signal source, determine location information and posture information, and perform movement and control, on the basis of signal received through the linear array antenna; and a ground station determining three-dimensional location information of the signal source on the basis of the location information, the posture information, and the azimuth provided from the at least one unmanned aerial vehicle.

The features briefly summarized above for this disclosure are only exemplary aspects of the detailed description of the disclosure which follow, and are not intended to limit the scope of the disclosure.

According to the present disclosure, it is possible to provide a method and an apparatus for determining three-dimensional location information of a signal source using an azimuth measured at multiple locations from an unmanned aerial vehicle provided with a linear array antenna.

Also, according to the present disclosure, it is possible to provide a method and an apparatus for accurately determining three-dimensional location information of a signal source using a small unmanned aerial vehicle.

The effects obtainable from the present disclosure are not limited to the effects mentioned above, and other effects not mentioned can be clearly understood by those skilled in the art from the description below.

BRIEF DESCRIPTION OF THE DRAWINGS

The above and other objects, features and other advantages of the present invention will be more clearly understood from the following detailed description when taken in conjunction with the accompanying drawings, in which:

FIGS. 4A to 4C illustrate an operation for determining location information of a signal source using an unmanned aerial vehicle according to an embodiment of the present disclosure;

DETAILED DESCRIPTION OF THE INVENTION

Figure 1:
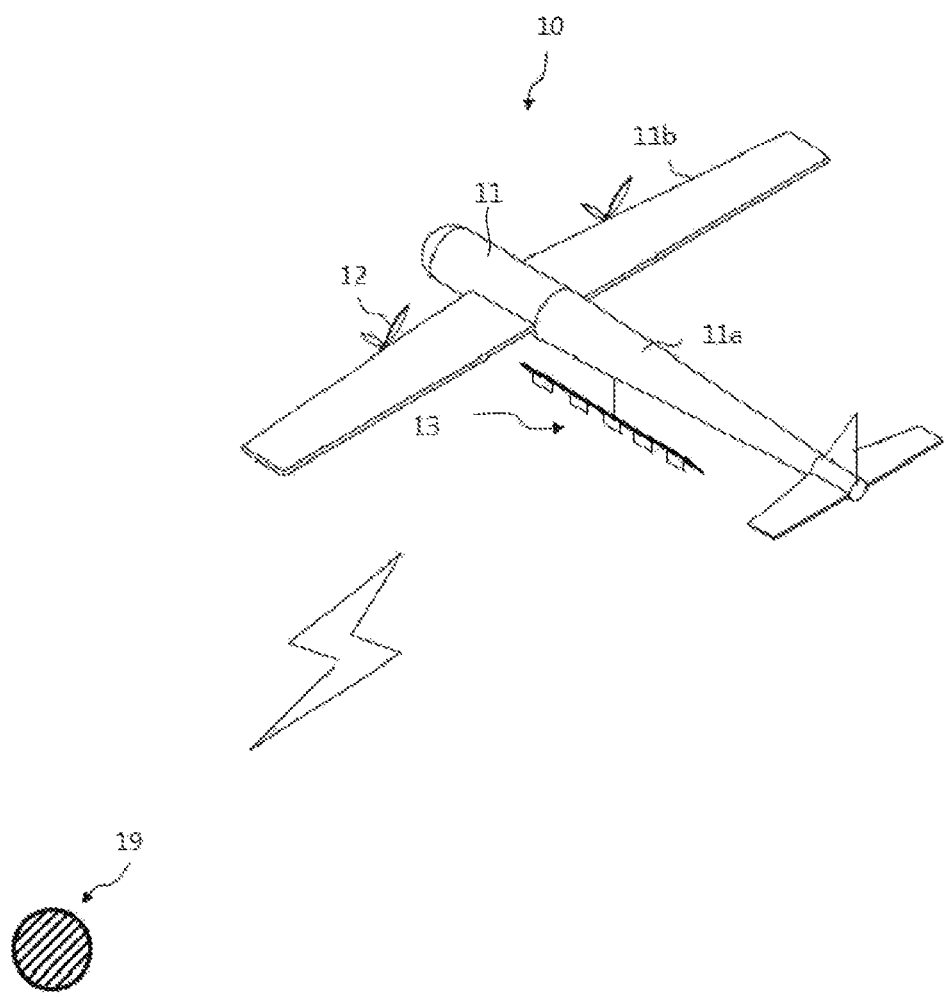
FIG. 1 is a diagram illustrating an unmanned aerial vehicle according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinbelow, embodiments of the present invention will be described referring to the accompanying drawings.

Figure 2:
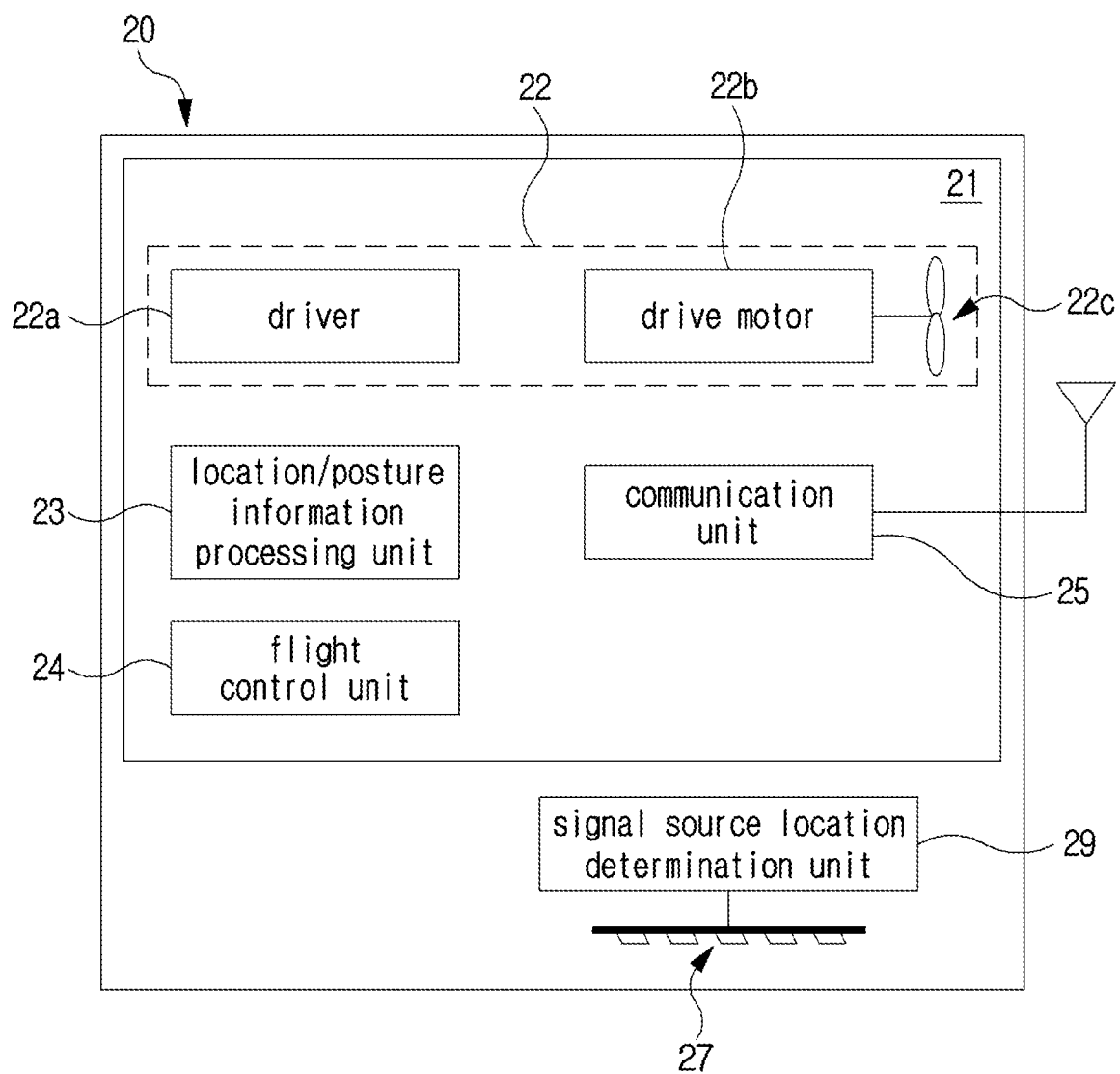
FIG. 2 is a block diagram illustrating a configuration of an unmanned aerial vehicle according to an embodiment of the present disclosure.

FIG. 1 is a diagram illustrating an unmanned aerial vehicle according to an embodiment of the present disclosure, and FIG. 2 is a block diagram illustrating a configuration of an unmanned aerial vehicle according to one embodiment of the present disclosure.

Referring to FIG. 1, an unmanned aerial vehicle 10 according to an embodiment of the present disclosure includes a body 11, a rotating blade drive unit 12 coupled to the body 11, and a linear array antenna 13.

The body 11 may include a reference body 11a and a fixing blade 11b.

The reference body 11a may be provided at a central portion of the unmanned aerial vehicle 10 and may be provided to have a space in which predetermined equipment may be loaded. For example, the internal space formed in the reference body 11a is loaded with a power source (e.g., battery) for supplying power to the unmanned aerial vehicle 10, a flight control processing unit for determining the location and posture of the unmanned aerial vehicle 10 and controlling movements thereof, and a signal source location determination unit for determining a three dimensional location of a signal source 19 on the basis of signals measured by the linear array antenna 13, and the like.

The fixing blade 11b may be configured so that at least one rotating blade drive unit 12 is coupled and fixed to the body 11 and the unmanned aerial vehicle 10 is moved by means of physical force formed by the rotating blade drive unit 12.

The linear array antenna 13 is a set of antennas in which the antenna elements are arranged in a linear array, and the plurality of antenna elements may be provided to be spaced at a predetermined interval. The linear array antenna 13 may be coupled to a portion of the body 11 (e.g., the reference body 11a) and connected to a signal source location determination unit to detect an RF signal from the signal source 19 and provide the RF signal to the signal source location determination unit.

The unmanned aerial vehicle 10 according to an embodiment of the present disclosure is exemplified as an unmanned aerial vehicle utilizing lifting force generated by a plurality of rotating blade drive units 12 and is configured with the body 11 and the blade drive unit 12, but this disclosure is not limited thereto. It is sufficient that the unmanned aerial vehicle according to the present disclosure is moved using a control signal transmitted from a remote place or a control signal based on a predetermined route, and the body 11, and the structure and shape of the body 11 and the rotating blade drive unit 12 may be variously changed. For example, an unmanned aerial vehicle may include a rotating blade (e.g., quadrotor, hexa-rotor) unmanned aerial vehicle (UAH) or a fixing blade unmanned aerial vehicle.

The signal source 19 may be a jammer that generates an unwanted radio signal, or may be an entity that generates a signal for a rescue and search.

Meanwhile, referring to FIG. 2, the unmanned aerial vehicle 20 may include a flight control processing unit 21, a linear array antenna 27, and a signal source location determination unit 29.

The flight control processing unit 21 may include a rotating blade drive unit 22, a location/posture information processing unit 23, and a flight control unit 24.

The rotating blade drive unit 22 corresponds to the rotating blade drive unit 12 described above in FIG. 1 and may include a drive motor 22b, a driver 22a, and a rotating blade 22c. The driver 22a may provide the power necessary to drive the drive motor 22a, e.g., electric power. In particular, the rotational speed of the drive motor 22b may be controlled through voltage or current control corresponding to the control signal provided from the flight control unit 24.

The location/posture information processing unit 23 may determine the location information and posture information of the unmanned aerial vehicle 10 and provide the result to the flight control unit 24 or the signal source location determination unit 29. For example, the location/posture information processing unit 23 may include a GPS processing module that detects its own location based on a GPS signal and provides the location information detected based on a GPS signal. The location/posture information processing unit 23 may include a sensor for sensing movements of the unmanned aerial vehicle 10, such as, for example, an acceleration sensor, a gyro sensor, a geomagnetic sensor, and the like, and the location/posture information processing unit 23 may provide information indicating angles ($\alpha$, $\beta$, $\gamma$) with respect to a yaw, a pitch, and a roll, as the posture information.

The unmanned aerial vehicle 20 may further include a communication unit 25. The communication unit 25 is responsible for communication between a ground station and the unmanned aerial vehicle and receives control commands from the ground station or transmits data collected from the unmanned aerial vehicle to the ground station.

The flight control unit 24 may generate and provide control signals for controlling operations of the rotating blade drive unit 22, the location/posture information processing unit 23, and the communication unit 25. The flight control unit 24 may generate the control signals by reflecting signals or information provided from the rotating blade drive unit 22, the location/posture information processing unit 23, and the communication unit 25.

For example, the flight control unit 24 may set a travel path to a plurality of destinations that is predetermined on the basis of the location information provided from the location/posture information processing unit 23, and may control the rotating blade drive unit 22 so that the unmanned aerial vehicle 10 moves along the set travel path.

As another example, the communication unit 25 may communicate with the ground station, and may receive the travel path provided by the ground station and provide it to the flight control unit 24. Accordingly, the flight control unit 24 may control the rotating blade drive unit 22 so that the unmanned aerial vehicle 10 is moved along the set travel path.

As another example, the communication unit 25 receives a flight control signal provided in real time from the ground station and provides the flight control signal to the flight control unit 24, and the flight control unit 24 may control the rotating blade drive unit 22 on the basis of the flight control signal.

The linear array antenna 27 corresponds to the linear array antenna 13 mentioned above referring to FIG. 1, and the signal source location determination unit 29 is connected to the linear array antenna 27. The signal source location determination unit 29 may measure an azimuth between the linear array antenna 27 and the signal source on the basis of the RF signal detected from the linear array antenna 27.

The signal source location determination unit 29 may determine information on multiple locations and postures provided from the location/posture information processing unit and multiple measured azimuths corresponding to the information, and determine three-dimensional location information of the signal source using the information on multiple locations and postures, and the multiple measured azimuths.

Hereinafter, operations for determining the three-dimensional location information of the signal source 19 using the location information, the posture information, and the measured azimuths will be described in more detail.

Figure 3A:
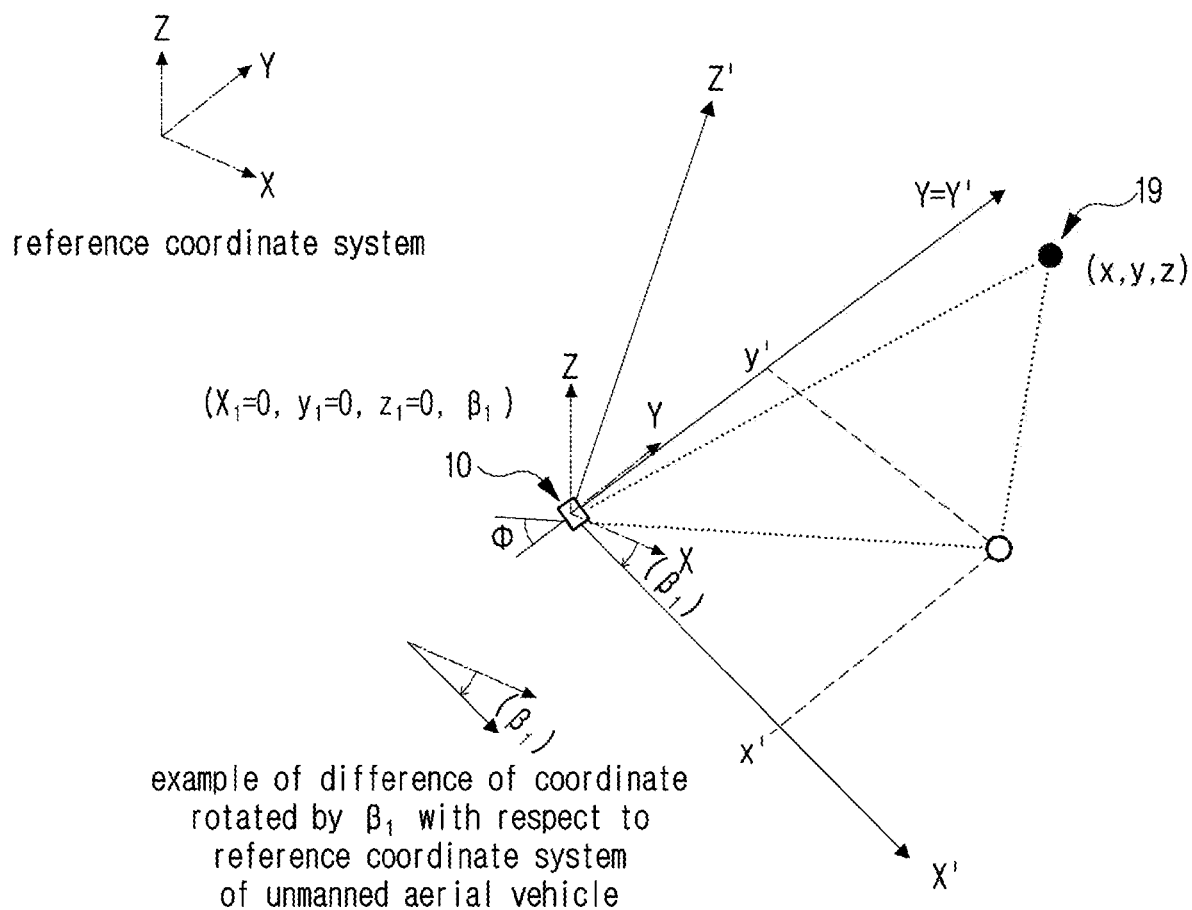
FIG. 3A is a diagram illustrating a positional relationship between an unmanned aerial vehicle and a signal source according to an embodiment of the present disclosure.
Figure 3B:
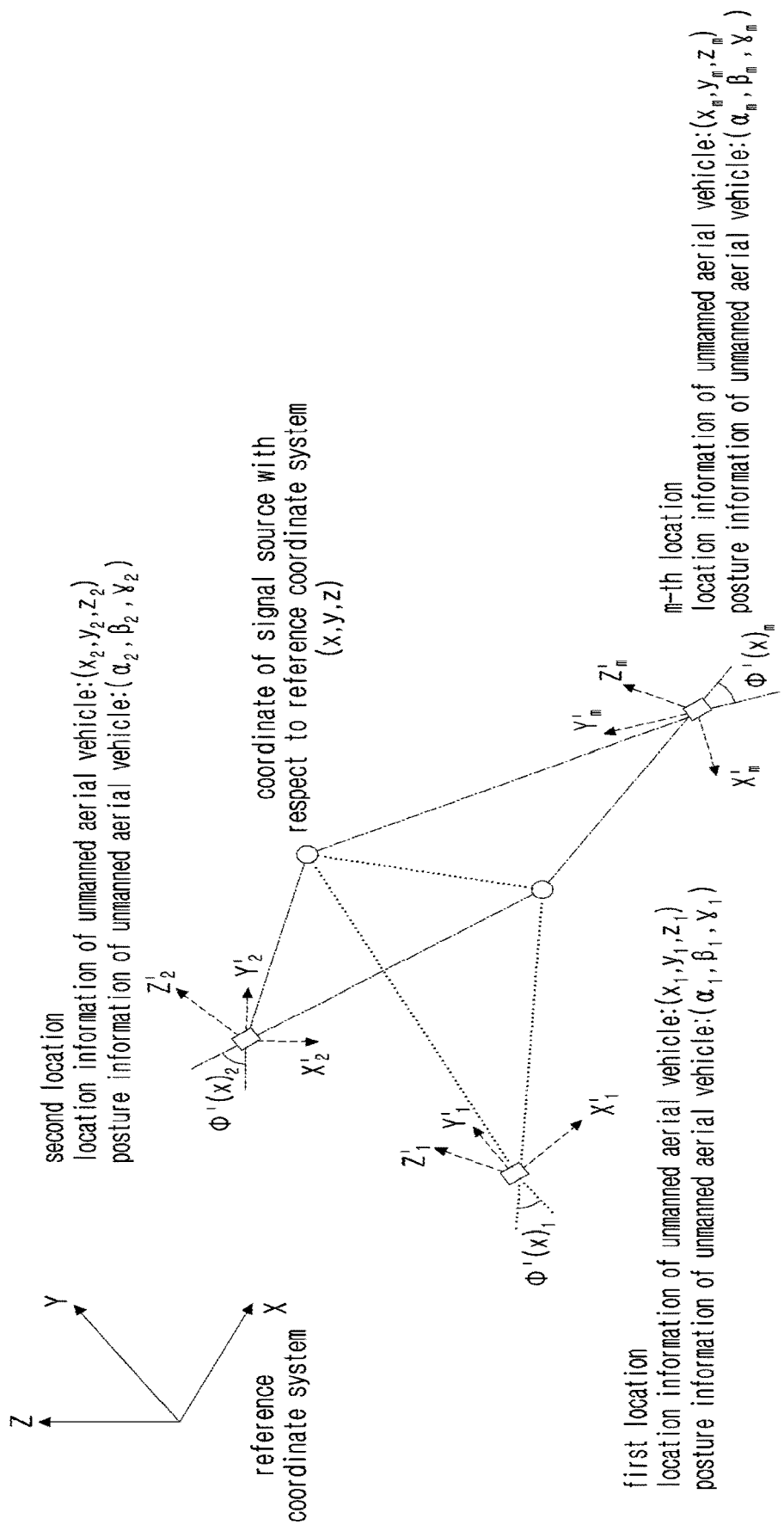
FIG. 3B is a diagram showing a positional relationship between an unmanned aerial vehicle and a signal source at multiple locations based on FIG. 3A.

FIG. 3A is a diagram illustrating a positional relationship between an unmanned aerial vehicle and a signal source according to an embodiment of the present disclosure, and FIG. 3B is a diagram showing a positional relationship between an unmanned aerial vehicle and a signal source at multiple locations on the basis of FIG. 3A.

Referring to FIG. 3A, when the unmanned aerial vehicle 10 is located at a first location ($x_1$, $y_1$, $z_1$) with respect to a three-dimensional reference coordinate system and has the first posture information ($\alpha_1$, $\beta_1$, $\gamma_1$) indicating angles with respect to a yaw, a pitch, and a roll in the unmanned aerial vehicle 10, a relationship between a location (x, y, z) of the signal source 19 and an azimuth ($\Phi$) for the linear array antenna 27 will be described.

When the posture of the unmanned aerial vehicle 10 has no rotation with respect to a reference coordinate system (i.e., $\alpha_1=0$, $\beta_1=0$, $\gamma_1=0$) the relative locations from the unmanned aerial vehicle 10 to the signal source may be expressed as (x-$x_1$, z-$z_1$), on the basis of the reference coordinate system.

When the unmanned aerial vehicle 10 is rotated at an arbitrary angle ($\alpha_1$, $\beta_1$, $\gamma_1$) with respect to the reference coordinate system, on the basis of the rotational coordinate system (X', Y', Z') corresponding to the posture of the rotated unmanned aerial vehicle 10, the relative location from the unmanned aerial vehicle 10 to the signal source may be indicated as (x'-$x_1$, y'-$y_1$, z'-$z_1$).

With respect to m-th location of the unmanned aerial vehicle (m=1, 2, and M, M is a natural number), a relationship between a coordinate (x, y, z) of the reference coordinate system and a coordinate (x', y', z') of the rotating coordinate system may be indicated as Equation 1 and Equation 2 below.

$$x = Q x_{*}$$ [Equation 1]

where $$x = \begin{bmatrix} x - x_m \\ y - y_m \\ z - z_m \end{bmatrix}, \quad x' = \begin{bmatrix} x' - x_m \\ y' - y_m \\ z' - z_m \end{bmatrix}_{*}$$

$$Q = \begin{bmatrix} \cos\beta\cos\alpha & -\cos\gamma\sin\alpha + \sin\gamma\sin\beta\cos\alpha & \sin\gamma\sin\alpha + \cos\gamma\sin\beta\cos\alpha \\ \cos\beta\sin\alpha & \cos\gamma\cos\alpha + \sin\gamma\sin\beta\sin\alpha & -\sin\gamma\cos\alpha + \cos\gamma\sin\beta\sin\alpha \\ -\sin\beta & \sin\gamma\cos\beta & \cos\gamma\cos\beta \end{bmatrix}_{*}$$

$$x' = Q^{-1} x_{*}$$ [Equation 2]

where $$x = \begin{bmatrix} x - x_m \\ y - y_m \\ z - z_m \end{bmatrix}, \quad x' = \begin{bmatrix} x' - x_m \\ y' - y_m \\ z' - z_m \end{bmatrix}_{*}$$

$$Q = \begin{bmatrix} \cos\beta\cos\alpha & -\cos\gamma\sin\alpha + \sin\gamma\sin\beta\cos\alpha & \sin\gamma\sin\alpha + \cos\gamma\sin\beta\cos\alpha \\ \cos\beta\sin\alpha & \cos\gamma\cos\alpha + \sin\gamma\sin\beta\sin\alpha & -\sin\gamma\cos\alpha + \cos\gamma\sin\beta\sin\alpha \\ -\sin\beta & \sin\gamma\cos\beta & \cos\gamma\cos\beta \end{bmatrix}_{*}$$

In the state where the unmanned aerial vehicle 10 is rotated by the first posture information ($\alpha_1$, $\beta_1$, $\gamma_1$), a relationship between an azimuth ($\Phi'$) from the linear array antenna 27 to the signal source 19 and a location (x, y, z) of the signal source with respect to the reference coordinate system may be expressed by Equation 3 below.

$$\phi'(x)_{\square} = \tan^{-1}\frac{y'}{x'} = \tan^{-1}\frac{[Q_\square^{-1} x]_{12}}{[Q_\square^{-1} x]_{11}}_{*}$$ [Equation 3]

Wherein, [A]i,j is a value in the i-th row and the j-th column of the matrix A.

As described above, when the unmanned aerial vehicle is located at the first location ($x_1$, $y_1$, $z_1$) with the first posture information ($\alpha_1$, $\beta_1$, $\gamma_1$), a relational expression for the azimuth between the signal source 19 and the linear array antenna 27 of the unmanned aerial vehicle 10 may be established as Equation 3.

Hereinafter, in various embodiments of the present disclosure, the azimuth based on the relational expression indicated by Equation 3 is described as a prediction azimuth.

Referring to FIG. 3B, the signal source location determination unit 29 may determine information on multiple locations and postures corresponding to multiple locations respectively, and establish a relational expression between the information at each location and the prediction azimuth. Specifically, the unmanned aerial vehicle 10 calculates a relational expression for the first prediction azimuth ($\Phi'_1$) on the basis of the first location information ($x_1$, $y_1$, $z_1$) and the first posture information ($\alpha_1$, $\beta_2$, $\gamma_1$) at the first location, calculates a relational expression for the second prediction azimuth ($\Phi'_2$) on the basis of the second location information ($x_2$, $y_2$, $z_2$) and the second posture information ($\alpha_2$, $\beta_2$, $\gamma_2$) at the second location, and calculates a relational expression for the m-th prediction azimuth ($\Phi'_1$) on the basis of the m-th location information ($x_m$, $y_m$, $z_m$) and the m-th posture information ($\alpha_m$, $\beta_m$, $\gamma_m$) at the m-th location (m=1, 2, . . . , M).

Further, the signal source location determination unit 29 determines measured azimuths at multiple locations, i. e., the first measurement azimuth ($\hat{\phi}'_2$) at the first location, the second measurement azimuth ($\hat{\phi}'_2$) at the second location, and the m-th measurement azimuth ($\hat{\phi}'_m$) at the m-th location, on the basis of the RF signal detected from the linear array antenna 27.

On the other hand, a relationship between the prediction azimuths and the measured azimuths mentioned above may be expressed as Equation 4 below.

$$\hat{\phi}' = \phi'(x) + n.$$ [Equation 4]

Wherein, $\hat{\phi}'$ is a vector (Equation 5) consisting of measured azimuths measured at multiple locations (m=1, 2, . . . , M), $\phi'(x)$ is a vector (Equation 6) consisting of prediction azimuths based on Equation 3, and n is a vector (Equation 7) consisting of measurement errors.

$$\hat{\phi}' = [\hat{\phi}'_1, \ldots, \phi'(x)_M]^T$$ [Equation 5]

$$\phi'(x) = [\phi'(x)_1, \ldots, \phi'(x)_M]^T$$ [Equation 6]

$$n = [n_1, \ldots, n_M]^T$$ [Equation 7]

The signal source location determination unit 29 may determine three-dimensional location information (x, y, z) of the signal source 19, in consideration of the relationship between the prediction azimuths and the measured azimuths indicated in Equation 4, and perform computation to minimize the measurement errors between M prediction azimuths and M measured azimuths.

For example, the signal source location determination unit 29 may determine the three-dimensional location information (x, y, z) of the signal source 19 using M prediction azimuths and measured azimuths on the basis of a least square (LS) method or a maximum likelihood method.

As another example, the signal source location determination unit 29 may also determine the three-dimensional location information (x, y, z) of the signal source 19 by a repetitive procedure based on Gradient descent method, Gauss-Newton method, Newton-Raphson method, and the like.

In performing an iterative procedure based on the above-described scheme, the initial location information has to be set as close as possible to the actual location, in consideration of the amount of computation and convergence of the iterative procedure. To this end, the signal source location determination unit 29 may calculate the initial two-dimensional location information using multiple measured azimuths measured at multiple locations, respectively. For example, the signal source location determination unit 29 may calculate initial two-dimensional location information on the basis of Equation 8 below.

$$\begin{bmatrix} x_{init} \\ y_{init} \end{bmatrix} = (A^T A)^{-1} A^T b \qquad \text{[Equation 8]}$$

where $$A^T = \begin{bmatrix} \sin(\hat{\phi}_1') & -\cos(\hat{\phi}_1') \\ \vdots & \vdots \\ \sin(\hat{\phi}_M') & -\cos(\hat{\phi}_M') \end{bmatrix}$$

$$b = \begin{bmatrix} \sin(\hat{\phi}_1')x_1 - \cos(\hat{\phi}_1')y_1 \\ \vdots \\ \sin(\hat{\phi}_M')x_M - \cos(\hat{\phi}_M')y_M \end{bmatrix}$$

That is, the signal source location determination unit 29 calculates an initial two-dimensional location ($x_{init}$, $y_{init}$) of the signal source by Equation 8 from M measured azimuths and a two-dimensional location coordinate ($x_m$, $y_m$), (herein, m=1, 2, ..., M) of the unmanned aerial vehicle.

In addition, the signal source location determination unit 29 sets a vertical coordinate $z_{init}$ of the initial three-dimensional location information ($x_{init}$, $y_{init}$, $z_{init}$) used for the iterative procedure for determining the signal source location information, as zero or an arbitrary value set within any range.

Meanwhile, in order to determine two-dimensional location information (x, y) of the signal source 19, location information, and posture information, measured azimuths for at least two locations are required, and in order to determine three-dimensional location information (x, y, z) of the signal source 19, location information, and posture information, measured azimuths for at least three locations are required. When it is required to calculate the two-dimensional location information (x, y) of the signal source 19, the signal source location determination unit 29 determines the location information, posture information, and measured azimuths for at least two locations to compute the two-dimensional location information (x, y) of the signal source 19. Similarly, when the three-dimensional location information (x, y, z) calculation of the signal source 19 is required, the signal source location determination unit 29 determines location information, posture information, measured azimuths for at least three locations to compute the three-dimensional location information (x, y, z) of the signal source 19.

In the embodiment of the present disclosure, it has been illustrated that the signal source location determination unit 29 determines the three-dimensional location information of the signal source using information on multiple locations and postures, and multiple measured azimuths, but the present disclosure is not limited thereto.

It is sufficient that the present invention includes a configuration for determining a measurement azimuth from a linear array antenna 27 provided in an unmanned aerial vehicle to a signal source, and a configuration for computing three-dimension location information of the signal source in consideration of a relationship between the information on multiple locations and postures, the multiple measured azimuths, and the signal source. Various modifications or adaptations may be made based on such technical ideas.

Figure 4A:
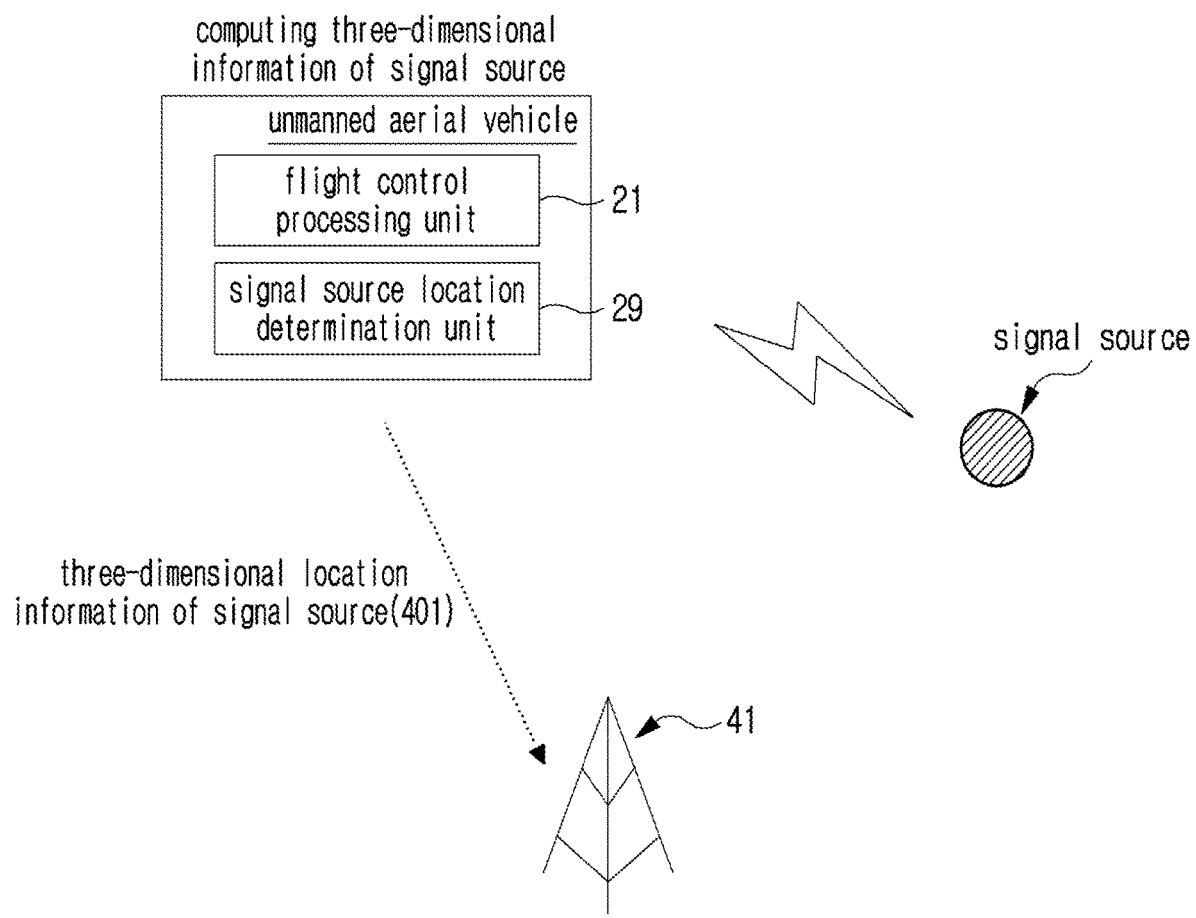

For example, the signal source location determination unit 29 determines the three-dimensional location information of the signal source using the information on multiple locations and postures and the multiple measured azimuths, and provides the results to the flight control processing unit 21, and the flight control processing unit 21 provides the three-dimensional location information 401 (see FIG. 4A) of the signal source to the ground station 41.

Figure 4B:
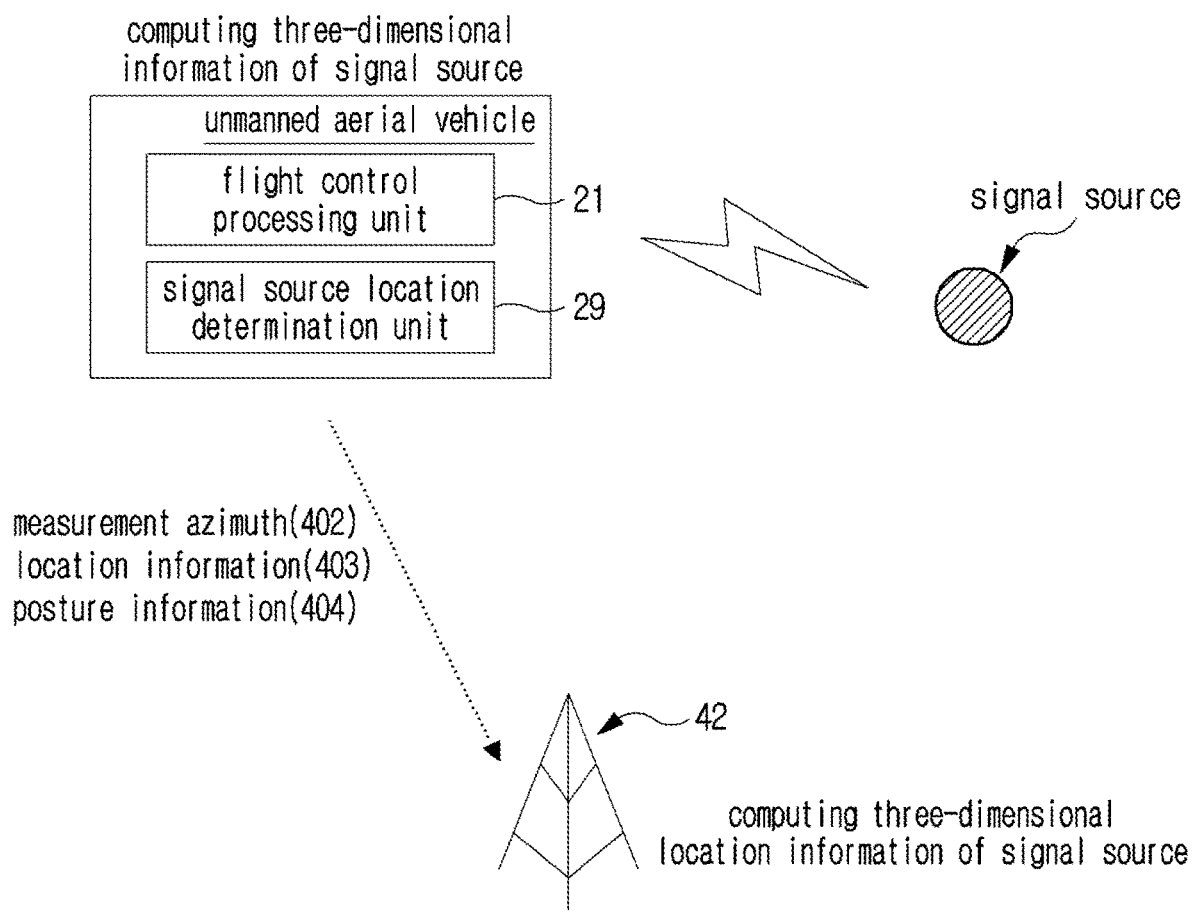

As another example, the signal source location determination unit 29 may provide the measurement azimuth to the flight control processing unit 21, and the flight control processing unit 21 may provide the ground station 42 with multiple measured azimuths (402, see FIG. 4B) and information on multiple locations and postures 403, 404 corresponding to the measured azimuths. Accordingly, the ground station may compute the three-dimensional location information of the signal source using the information on multiple locations and postures, and the multiple measured azimuths.

Herein, a single unmanned aerial vehicle provides the ground station 42 with the information on multiple locations and postures, and the multiple measured azimuths corresponding to multiple locations, or a plurality of unmanned aerial vehicles provided at locations different from each other may provide the ground station 42 with information on multiple locations, postures, and measured azimuths, respectively.

As another example, the flight control processing unit 21 may receive, via communication with other unmanned aerial vehicles 43-1, 43-2, and 43-M, location information, posture information, and measured azimuths 405-1, 406-1, 407-1, 405-2, 406-2, 407-2, ... 405-M, 406-M, and 407-M determined in other unmanned aerial vehicles (see FIG. 4c), and the signal source location determination unit 29 may compute the three-dimension location information of the signal source using the location information, posture information, and measured azimuths determined itself and the location information, posture information, and measured azimuths 405-1, 406-1, 407-1, 405-2, 406-2, 407-2, ... , 405-M, 406-M, and 407-M determined by other unmanned aerial vehicles.

Furthermore, although the flight control unit 24 and the signal source location determination unit 29 have been described as separate components to clearly illustrate the features thereof, it is not necessary that the components are separate. That is, a plurality of components may be integrated into one hardware or software unit, or a single component may be distributed into a plurality of hardware or software units.

Figure 5:
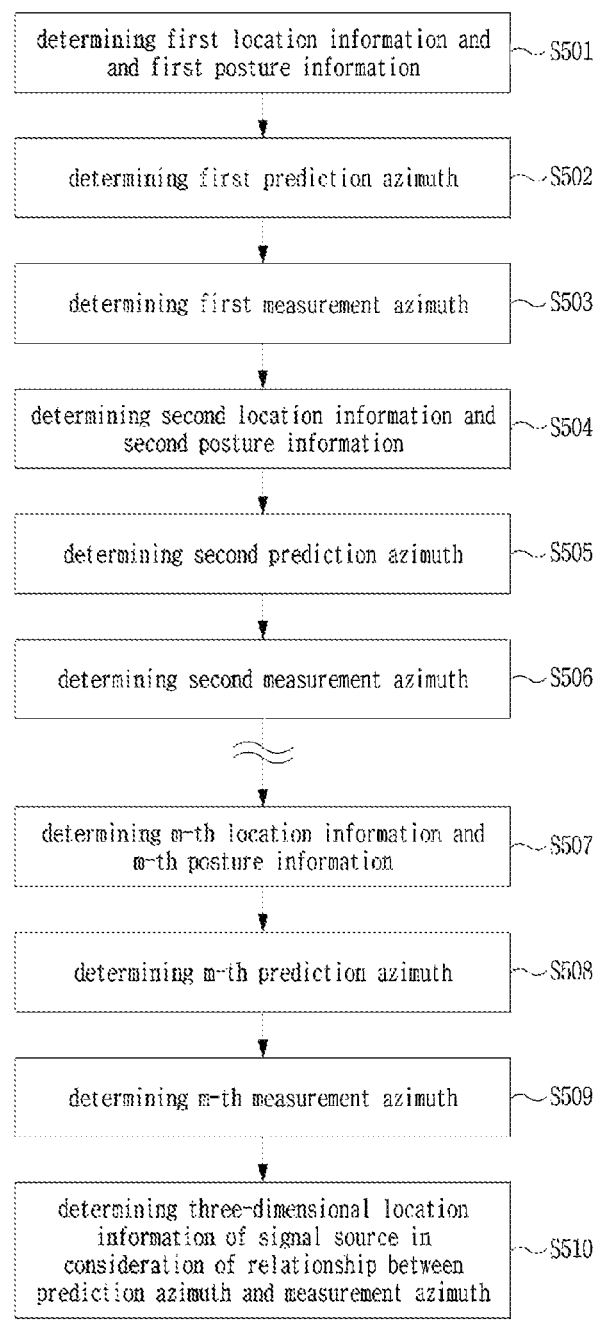
FIG. 5 is a flowchart illustrating a method of determining location information of a signal source according to an embodiment of the present disclosure.

FIG. 5 is a flowchart showing procedures of a method of determining location information of a signal source according to an embodiment of the present disclosure A method of determining location information of a signal source according to an embodiment of the present disclosure may be performed by the unmanned aerial vehicle described above.

In step S501, the unmanned aerial vehicle may determine the first location information ($x_1$, $y_1$, $z_1$) and the first posture information ($\alpha_1$, $\beta_1$, $\gamma_1$) at the first predetermined location.

As described in FIGS. 3A and 3B, when the unmanned aerial vehicle 10 is located at the first location ($x_1$, $y_1$, $z_1$) with the first posture information ($\alpha_1$, $\beta_1$, $\gamma_1$), a relationship of the prediction azimuth between the signal source 19 and the unmanned aerial vehicle may be indicated as in Equation 3. Accordingly, in step S502, the unmanned aerial vehicle may compute a relational expression of the first prediction azimuth ($\Phi'_1$) at the first location on the basis of Equation 3.

In step S503, the unmanned aerial vehicle may determine the measurement azimuth, i.e., the first measurement azimuth ($\hat{\phi}'_2$) on the basis of the RF signal detected from the linear array antenna provided in the unmanned aerial vehicle at the first location.

The unmanned aerial vehicle determines the second location information ($x_2$, $Y_2$, $z_2$) and the second posture information ($\alpha_2$, $\beta_2$, $\gamma_2$) at the second location (S504), and computes a relational expression of the second prediction azimuth ($\Phi'_2$) corresponding to the second location information ($x_2$, $Y_2$, $z_2$) and the second posture information ($\alpha_2$, $\beta_2$, $\gamma_2$) in consideration of a relationship between the location information and the posture information, and the prediction azimuth indicated in Equation 3 (S505).

In addition, the unmanned aerial vehicle may determine the measurement azimuth, i.e., the second measurement azimuth on the basis of the RF signal detected from the linear array antenna provided in the unmanned aerial vehicle at the second location (S506).

Further, the unmanned aerial vehicle performs steps S501 to S503 or steps S504 to S506 repetitively so that it is possible to determine the m-th location information ($x_m$, $y_m$, $z_m$), the m-th posture information ($\alpha_m$, $\beta_m$, $\gamma_m$) the m-th prediction azimuth ($\Phi'_m$), and the m-th measurement azimuth ($\hat{\phi}'_m$) at the m-th location (m=1, 2, . . . , M) (S507, S508, S509).

In the steps S501 to S509 described above, as the unmanned aerial vehicle moves, the m-th location information ($x_m$, $y_m$, $z_m$), the m-th posture information ($\alpha_m$, $\beta_m$, $\gamma_m$), the m-th prediction azimuth ($\Psi\Phi_m$), and the m-th measurement azimuth ($\hat{\phi}'_m$) are measured at the m-th location (m=1, 2, . . . , M), or the m-th location information ($x_m$, $y_m$, $z_m$), the m-th posture information ($\alpha_m$, $\beta_m$, $\gamma_m$) r the m-th prediction azimuth ($\Phi'_m$), and the m-th measurement azimuth ($\hat{\phi}'_m$) are received from another unmanned aerial vehicle that is present at the m-th location (m=1, 2, . . . , M), so that it is possible to determine the m-th location information ($x_m$, $y_m$, $z_m$) the m-th posture information ($\alpha_m$, $\beta_m$, $\gamma_m$) the m-th prediction azimuth ($\Phi_m$), and the m-th measurement azimuth ($\hat{\phi}'_m$).

As another example, the unmanned aerial vehicle receives the m-th location information ($x_m$, $y_m$, $z_m$), the m-th posture information ($\alpha_m$, $\beta_m$, $\gamma_m$), the m-th prediction azimuth ($\Phi'_m$), and the m-th measurement azimuth ($\hat{\phi}'_m$) from another unmanned aerial vehicle that is present at the m-th location (m=1, 2, . . . , M) and computes a relational expression of the m-th prediction azimuth ($\Phi'_m$) using the m-th location information ($x_m$, $y_m$, $z_m$) and the m-th posture information ($\alpha_m$, $\beta_m$, $\gamma_m$).

Meanwhile, in step S510, the unmanned aerial vehicle may determine three-dimensional location information (x, y, z) of the signal source 19 through a computation to minimize measurement errors between M prediction azimuths and M measured azimuths, in consideration of a relationship between the prediction azimuth and the measurement azimuth indicated in Equation 4.

For example, the unmanned aerial vehicle may determine the three-dimensional location information (x, y, z) of the signal source 19 using M prediction azimuths and measured azimuths on the basis of a least square (LS) method or a maximum likelihood method.

As another example, the unmanned aerial vehicle may also determine the three-dimensional location information (x, y, z) of the signal source 19 by a repetitive procedure based on Gradient descent method, Gauss-Newton method, Newton-Raphson method, and the like.

In performing an iterative procedure based on the above-described scheme, the initial location information should be set as close as possible to the actual location, in the consideration of the amount of computation and convergence of the iterative procedure. To this end, the unmanned aerial vehicle may compute the initial two-dimensional location information using multiple (e.g., M) measured azimuths measured at multiple locations. For example, the unmanned aerial vehicle may compute initial two-dimensional location information on the basis of Equation 8 mentioned above.

In addition, the unmanned aerial vehicle sets a vertical coordinate $z_{init}$ of the initial three-dimensional location information ($x_{init}$, $y_{init}$, $z_{init}$) used for the iterative procedure, as zero or an arbitrary value set within any range.

Figure 6:
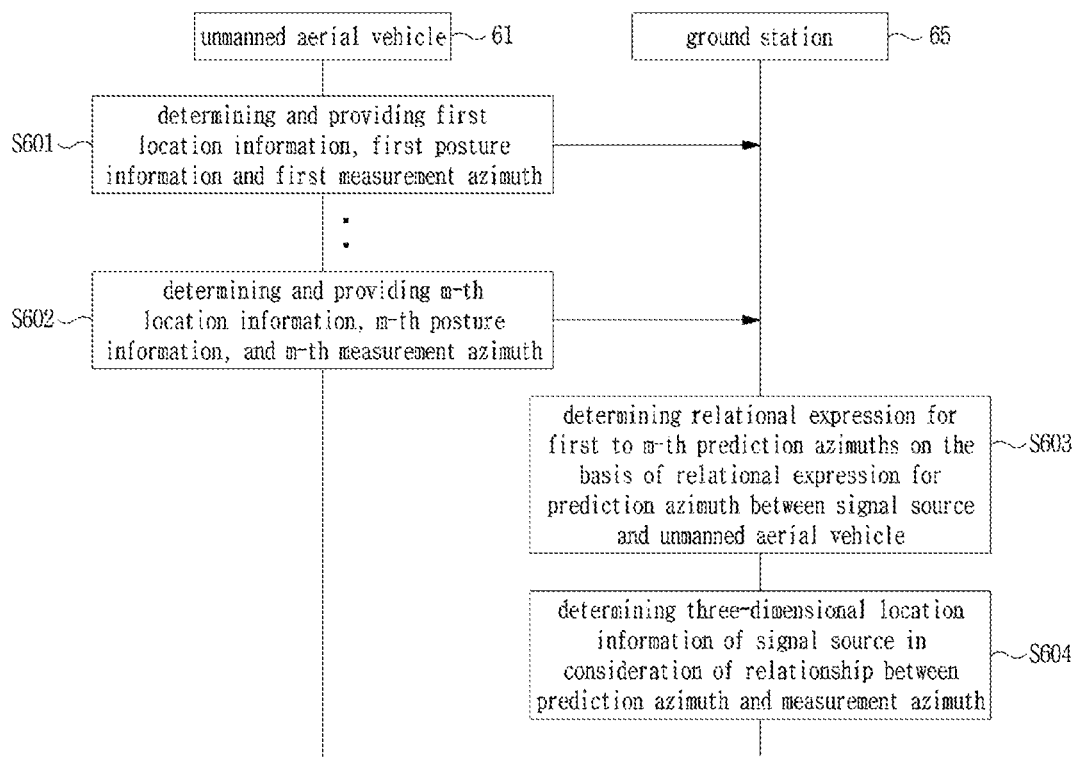
FIG. 6 is a flowchart illustrating a method of determining location information of a signal source according to another embodiment of the present disclosure.

FIG. 6 is a flowchart showing a procedure of a method of determining location information of a signal source according to another embodiment of the present disclosure.

A method for determining location information of a signal source according to another embodiment of the present disclosure may be performed by the unmanned aerial vehicle and the ground station described above.

The method of determining location information of a signal source according to another embodiment of the present disclosure is the same as the method of determining the location information of the signal source according to the embodiment of the present disclosure. However, they are different in that the method of determining the location information of the signal source according to an embodiment of the present disclosure is provided so that the unmanned aerial vehicle performs all operations of determining location information and posture information, computing a relational expression of prediction azimuth, determining measurement azimuth, determining three-dimensional location information of a signal source, and so on, and the method of determining location information of the signal source according to another embodiment of the present disclosure is provided so that the unmanned aerial vehicle performs operations of determining location information, posture information, and measurement azimuth and so on and the ground station performs operations of receiving location information, posture information, and measurement azimuth from the unmanned aerial vehicle, computing a relationship of prediction azimuth, determining three-dimensional location information of a signal source, and so on.

Specifically, in step S601, the unmanned aerial vehicle 61 determines the first location information ($x_1$, $y_1$, $z_1$), the first posture information ($\alpha_1$, $\beta_1$, $\gamma_1$) and the first measurement azimuth ($\hat{\phi}'_2$) at the first location and provides the determined information to the ground station 65.

The unmanned aerial vehicle 61 determines the m-th location information ($x_m$, $y_m$, $z_m$), the m-th posture information ($\alpha_m$, $\beta_m$, $\gamma_m$), and the m-th measurement azimuth at the m-th location (m=1, 2, M) and provides the determined information to the ground station 65 in a similar manner as step S601 (S602).

In steps S601 to S602, as the same unmanned aerial vehicle moves, location information, posture information, and measurement azimuth are determined at the m-th location (m=1, 2, M) respectively for M locations, and the determined information is provided to the ground station 65.

Alternatively, a plurality of unmanned aerial vehicles provided at M locations different from each other determines the location information, posture information, and measurement azimuth, respectively, and information determined by each of the unmanned aerial vehicles may be provided to the ground station 65.

As described in FIGS. 3A and 3B, when the unmanned aerial vehicle 10 is located at a first location ($x_1$, $y_1$, $z_1$) with the first posture information ($\alpha_1$, $\beta_1$, $\gamma_1$) a relational expression for the measurement azimuth between the signal source 19 and the unmanned aerial vehicle may be indicated as in the Equation 3. Accordingly, in step S603, the ground station 65 may compute a relational expression for the first to m-th prediction azimuth ($\Phi'_1$, . . . , $\Phi'_m$) at the first to the m-th location on the basis of Equation 3.

Meanwhile, in step S604, the ground station 65 may determine three-dimensional location information (x, y, z) of the signal source through a computation to minimize the measurement errors between M prediction azimuths and M measured azimuths, in consideration of a relationship between the prediction azimuth ($\Phi'$) and the measurement azimuth ($\hat{\phi}'$) indicated in Equation 4.

For example, the ground station 65 may determine the three-dimensional location information (x, y, z) of the signal source using M prediction azimuths and measured azimuths on the basis of a least square (LS) method or a maximum likelihood method.

As another example, the ground station 65 may also determine the three-dimensional location information (x, y, z) of the signal source by a repetitive procedure based on Gradient descent method, Gauss-Newton method, Newton-Raphson method, and the like.

In performing an iterative procedure based on the above-described scheme, the initial location information should be set as close as possible to the actual location, in consideration of the amount of computation and convergence of the iterative procedure. To this end, the ground station 65 may compute the initial two-dimensional location information using multiple (e.g., M) measured azimuths measured at multiple locations. For example, the ground station 65 may compute initial two-dimensional location information on the basis of Equation 8 mentioned above.

In addition, the ground station 65 sets a vertical coordinate $Z_{init}$ of the initial three-dimensional location information ($x_{init}$, $y_{init}$, $z_{init}$) used for the iterative procedure, as zero or an arbitrary value set within any range.

Figure 7:
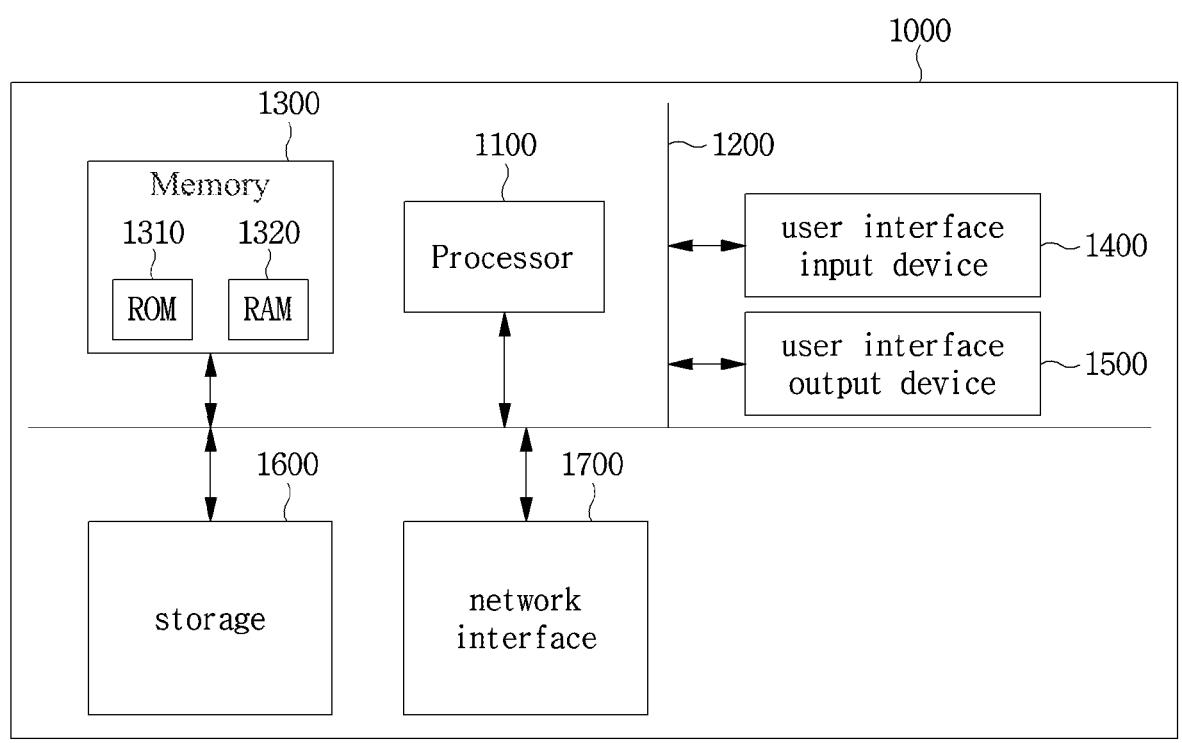
FIG. 7 is a block diagram illustrating a computing system that executes a method and an apparatus for determining location information of a signal source according to an embodiment of the present disclosure.

FIG. 7 is a block diagram illustrating a computing system that executes a method and an apparatus for determining location information of a signal source according to an embodiment of the present disclosure.

Referring to FIG. 7, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

The invention claimed is:

1. A method of determining location information of a signal source by using an unmanned aerial vehicle, the method comprising:

determining, at a first location, first location information and first posture information of the unmanned aerial vehicle provided with a linear array antenna;

determining, at the first location, a first measurement azimuth between the signal source and the linear array antenna;

determining, at a second location, second location information and second posture information of the unmanned aerial vehicle having the linear array antenna;

determining, at the second location, second measurement azimuth between the signal source and the linear array antenna; and determining the location information of the signal source using the first location information, the first posture information, the first measurement azimuth, the second location information, the second posture information, and the second measurement azimuth, wherein for a three-dimensional location information (x, y, z) calculation of the signal source, the location information, the posture information, the measured azimuths for each location are required to compute the three-dimensional location information of the signal source.

2. The method of claim 1, further comprising:
determining the first measurement azimuth at the first location and the second measurement azimuth at the second location while moving the unmanned aerial vehicle provided with the linear array antenna.

3. The method of claim 1, wherein the determining of the location information of the signal source includes:
determining a relationship between the first location information, the first posture information, the location information of the signal source, and a first prediction azimuth;
determining a relationship between the second location information, the second posture information, the location information of the signal source, and a second prediction azimuth; and
determining the location information of the signal source in consideration of a relationship between the first prediction azimuth and the second prediction azimuth, and the first measurement azimuth and the second measurement azimuth.

4. The method of claim 3, wherein the determining of the location information of the signal source includes:
determining initial location information based on a two-dimensional coordinate using the first measurement azimuth and the second measurement azimuth; and
determining final location information based on a three-dimensional coordinate by applying the first prediction azimuth and the second prediction azimuth, and the first measurement azimuth and the second measurement azimuth to the initial location information.

5. The method of claim 1, wherein the first posture information or the second posture information includes information indicating a three-axis rotation angle of the unmanned aerial vehicle.

6. An apparatus for determining location information of a signal source, the apparatus comprising:
a flight control processing unit determining location information and posture information of an unmanned aerial vehicle and controlling movements of the unmanned aerial vehicle;
a linear array antenna; and
a signal source location determination unit measuring a measurement azimuth corresponding to a signal received from the signal source using the linear array antenna, determining information on multiple locations and postures, and multiple measured azimuths corresponding to multiple locations different from each other respectively, and determining three-dimensional location information of the signal source on the basis of the information on multiple locations and postures, and the multiple measured azimuths,
wherein for a three-dimensional location information (x, y, z) calculation of the signal source, the location information, the posture information, the measured azimuths for each location are required to compute the three-dimensional location information of the signal source.

7. The apparatus of claim 6,
wherein the flight control processing unit provides a first location information and a first posture information at a first location, and second location information and second posture information the second location, to the signal source location determination unit; and
the signal source location determination unit determines a relationship between the first location information, the first posture information, the location information of the signal source, and a first prediction azimuth, and a relationship between the second location information, the second posture information, the location information of the signal source, and a second prediction azimuth.

8. The apparatus of claim 7, wherein the signal source location determination unit predicts the location information of the signal source in consideration of a relationship between the first prediction azimuth and the second prediction azimuth, and the first measurement azimuth and the second measurement azimuth.

9. The apparatus of claim 8,
wherein the signal source location determination unit determines initial location information based on a two-dimensional coordinate using the first measurement azimuth and the second measurement azimuth; and
determines final location information based on a three-dimensional coordinate by applying the first prediction azimuth and the second prediction azimuth, and the first measurement azimuth, and the second measurement azimuth to the initial location information.

10. The apparatus of claim 6, wherein the posture information includes information indicating a three-axis rotation angle of the unmanned aerial vehicle.

11. The apparatus of claim 6, wherein the flight control processing unit provides a ground station with the three-dimensional location information of the signal source provided from the signal source location determination unit.

12. The apparatus of claim 6, wherein the flight control processing unit provides the information on the multiple locations and postures, and multiple measured azimuths to the ground station for predicting the three-dimensional location information of the signal source.

13. A system for determining location information of a signal source, the system comprising:
at least one unmanned aerial vehicle having a linear array antenna to measure an azimuth to the signal source, determine location information and posture information of the at least one unmanned aerial vehicle, and perform movement and control, on the basis of a signal transmitted/received through the linear array antenna; and
a ground station determining three-dimensional location information of the signal source on the basis of the location information, the posture information, and the azimuth provided from the at least one unmanned aerial vehicle,
wherein for a three-dimensional location information (x, y, z) calculation of the signal source, the location information, the posture information, the measured azimuths for each location are required to compute the three-dimensional location information of the signal source.

14. The system of claim 13, wherein the ground station determines information on multiple locations and postures, and multiple measured azimuths corresponding to multiple locations different from each other respectively, and determines three-dimensional location information of the signal source on the basis of the information on multiple locations and postures, and multiple measured azimuths.

15. The system of claim 14, wherein the at least one unmanned aerial vehicle provides information on multiple locations and postures, and the multiple measured azimuths determined respectively at the multiple locations while being moved.

16. The system of claim 15, wherein the at least one unmanned aerial vehicle includes a plurality of unmanned aerial vehicles, the plurality of unmanned aerial vehicles provide the information on multiple locations and postures, and multiple measured azimuths determined respectively at the multiple locations while being moved.

17. The system of claim 13,
wherein the ground station determines a relationship between first location information, first posture information, the location information of the signal source, and a first prediction azimuth corresponding to a first location;
determines, at the first location, a first measurement azimuth between the signal source and the linear array antenna;
determines a relationship between second location information, second posture information, the location information of the signal source, and a second prediction azimuth corresponding to a second location;
determines, at the second location, at least one second measurement azimuth between the signal source and the linear array antenna; and
predicts the location information of the signal source in consideration of a relationship between the first prediction azimuth and the second prediction azimuth, and the first measurement azimuth and the second measurement azimuth.

18. The system of claim 17,
wherein the ground station determines initial location information based on a two-dimensional coordinate using the first measurement azimuth and the second measurement azimuth; and
determines final location information based on a three-dimensional coordinate by applying the first prediction azimuth and the second prediction azimuth, and the first measurement azimuth and the second measurement azimuth to the initial location information.

* * * * *